(12) United States Patent
Uffenkamp et al.

(10) Patent No.: US 10,482,347 B2
(45) Date of Patent: Nov. 19, 2019

(54) INSPECTION OF THE CONTOURED SURFACE OF THE UNDERCARRIAGE OF A MOTOR VEHICLE

(71) Applicant: Beissbarth GmbH, Munich (DE)

(72) Inventors: Volker Uffenkamp, Ludwigsburg (DE); Masato Takami, Hildesheim (DE); Guenter Nobis, Nuertingen (DE)

(73) Assignee: BEISSBARTH GMBH, Munich (DE)

( * ) Notice: Subject to any disclaimer, the term of this patent is extended or adjusted under 35 U.S.C. 154(b) by 180 days.

(21) Appl. No.: 14/901,393

(22) PCT Filed: Jun. 20, 2014

(86) PCT No.: PCT/EP2014/063040
§ 371 (c)(1),
(2) Date: Dec. 28, 2015

(87) PCT Pub. No.: WO2014/206888
PCT Pub. Date: Dec. 31, 2014

(65) Prior Publication Data
US 2016/0148073 A1   May 26, 2016

(30) Foreign Application Priority Data

Jun. 27, 2013  (DE) .......................... 10 2013 212 495

(51) Int. Cl.
*G06K 9/46* (2006.01)
*B60R 1/00* (2006.01)
(Continued)

(52) U.S. Cl.
CPC .............. *G06K 9/4661* (2013.01); *B60R 1/00* (2013.01); *G06K 9/4642* (2013.01);
(Continued)

(58) Field of Classification Search
CPC .............. G06K 9/4661; G06K 9/4642; G06K 2009/4666; B60R 1/00; G06T 2200/32;
(Continued)

(56) References Cited

U.S. PATENT DOCUMENTS 6,075,905 A    6/2000  Herman et al.
7,102,665 B1   9/2006  Chandler et al.
(Continued)

FOREIGN PATENT DOCUMENTS

CN    101945257 A    1/2011
CN    103080722 A    5/2013
(Continued)

OTHER PUBLICATIONS

International Search Report for PCT/EP2014/063040, dated Sep. 24, 2014.
(Continued)

*Primary Examiner* — Farzana Hossain
(74) *Attorney, Agent, or Firm* — Norton Rose Fulbright US LLP

(57) ABSTRACT

A method for providing an image of a contoured surface includes: a) recording images of one or a plurality of regions of the surface using different light exposure and/or illumination; b) generating an optimized image for each of the regions from the plurality of recorded images; and c) assembling the optimized images generated for the individual regions of the surface to form an optimized total image of the surface.

6 Claims, 14 Drawing Sheets

(51) Int. Cl.
*H04N 5/225* (2006.01)
*H04N 5/232* (2006.01)
*H04N 5/265* (2006.01)

(52) U.S. Cl.
CPC ....... *H04N 5/2256* (2013.01); *H04N 5/23245* (2013.01); *H04N 5/265* (2013.01); *G06K 2009/4666* (2013.01)

(58) Field of Classification Search
CPC . G06T 2207/10144; G06T 2207/10152; G06T 2207/20208; G06T 2207/20221; G06T 2207/30248; G06T 3/4038; G06T 5/009; G06T 5/50; H04N 5/2251; H04N 5/2256; H04N 5/23229; H04N 5/23238; H04N 5/23245; H04N 5/2354; H04N 5/265; H04N 7/183
USPC .......................................................... 348/148
See application file for complete search history.

(56) References Cited

U.S. PATENT DOCUMENTS

| | | | |
|---|---|---|---|
| 2002/0097321 A1 | 7/2002 | McBride | |
| 2006/0262190 A1* | 11/2006 | Millar | G06K 9/00577 348/148 |
| 2007/0273760 A1 | 11/2007 | Morrison et al. | |
| 2008/0136625 A1* | 6/2008 | Chew | G01V 5/0008 340/540 |
| 2008/0211914 A1 | 9/2008 | Herrera et al. | |
| 2008/0267441 A1* | 10/2008 | Bux | G01B 11/2755 382/100 |
| 2008/0292211 A1* | 11/2008 | Frantz | G01N 21/8806 382/284 |
| 2009/0290757 A1* | 11/2009 | Mian | G06K 9/00214 382/104 |
| 2010/0142814 A1 | 6/2010 | Damkjer et al. | |
| 2010/0245813 A1* | 9/2010 | Margalit | G01N 21/956 356/237.5 |
| 2011/0150329 A1* | 6/2011 | Lepine | G06T 3/4038 382/165 |
| 2013/0208140 A1* | 8/2013 | Quast | H04N 5/23203 348/229.1 |
| 2014/0192234 A1* | 7/2014 | Christoph | G01B 11/03 348/239 |

FOREIGN PATENT DOCUMENTS

WO WO 2004/110 054 12/2004
WO WO 2012/046372 4/2012

OTHER PUBLICATIONS

Burt P.J. et al.: "Enhanced image capture through fusion", Computer Vision 1993, Proceedings., Fourth International Conference, May 11, 1993, pp. 173-182.
European Office Action dated Aug. 20, 2018, issued in European Patent Application No. 14 732 172.3-1210, filing date Jun. 20, 2014.
https://en.wikipedia.org/w/index.php?title=Contrast_(vision)&oldid= 554085121#RMS_contrast.
https://en.wikipedia.org/w/index.php?title=Image_stitching&oldid= 549554056.

* cited by examiner

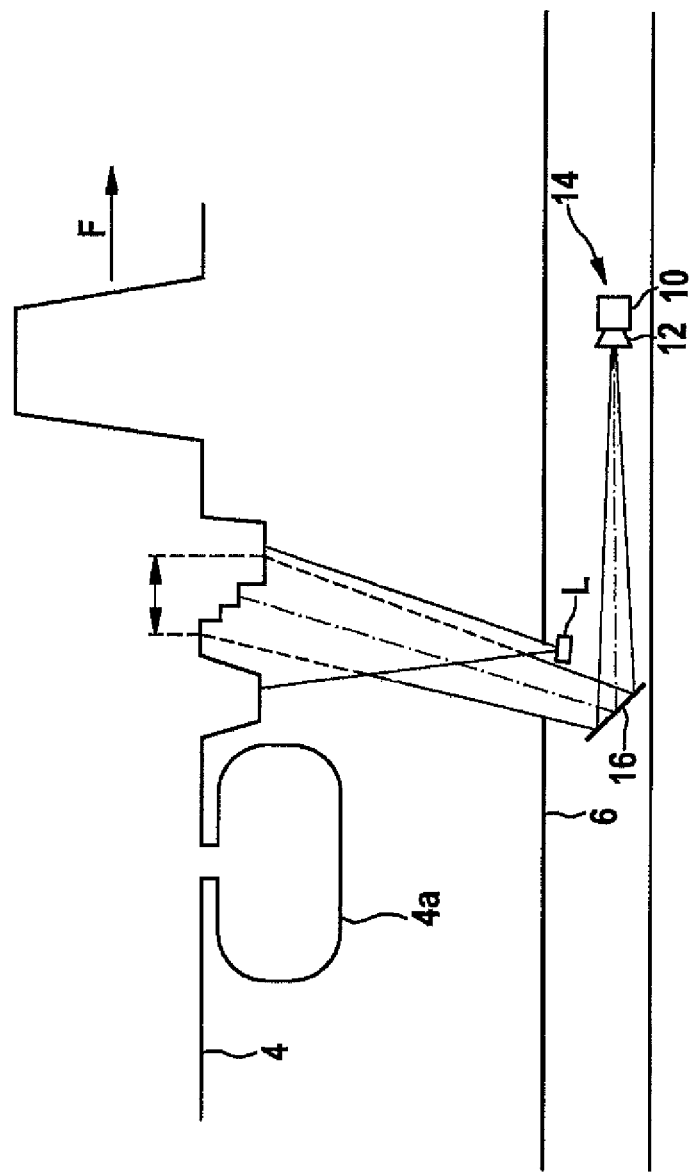

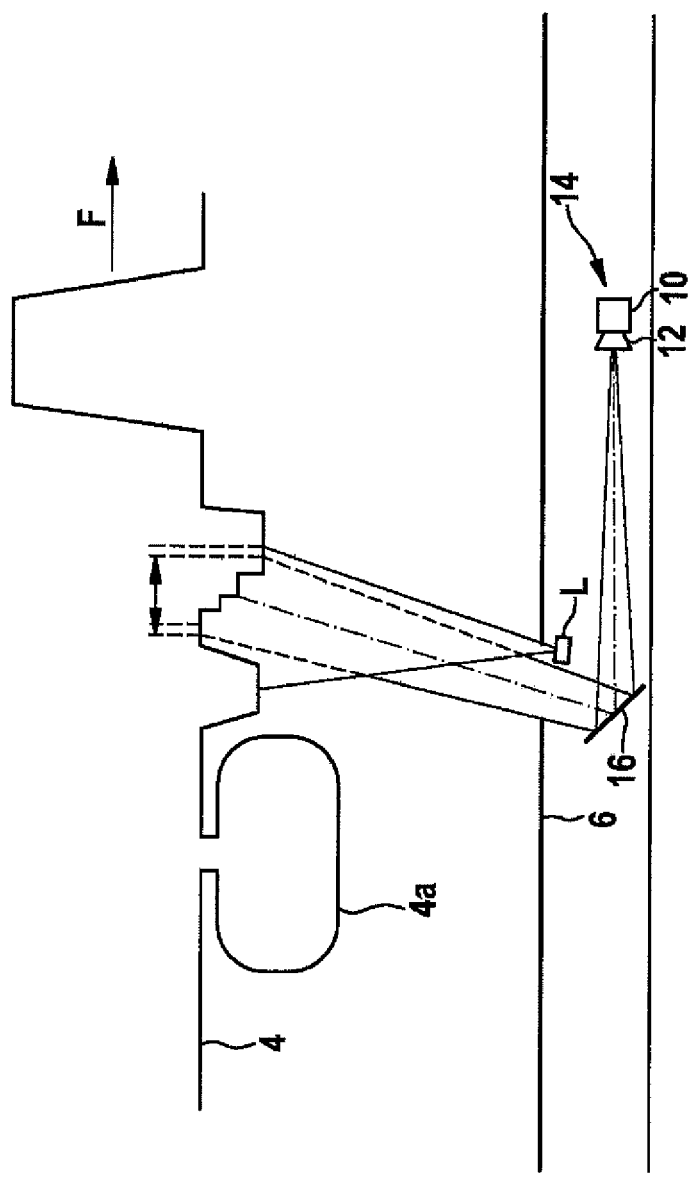

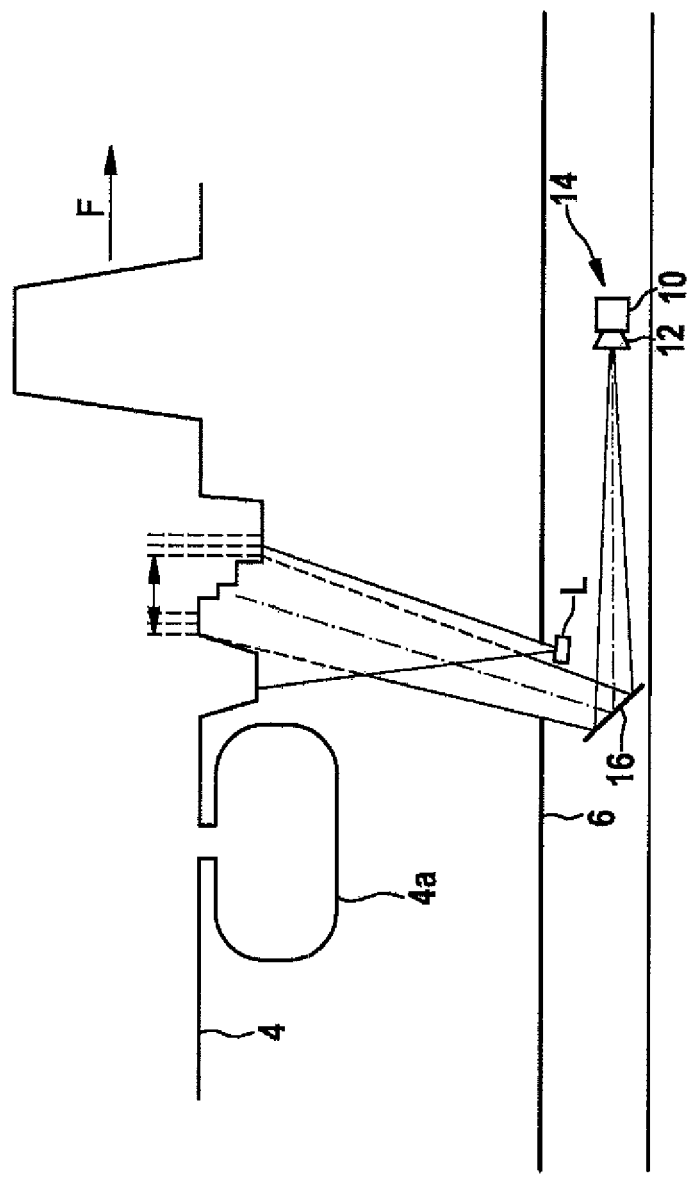

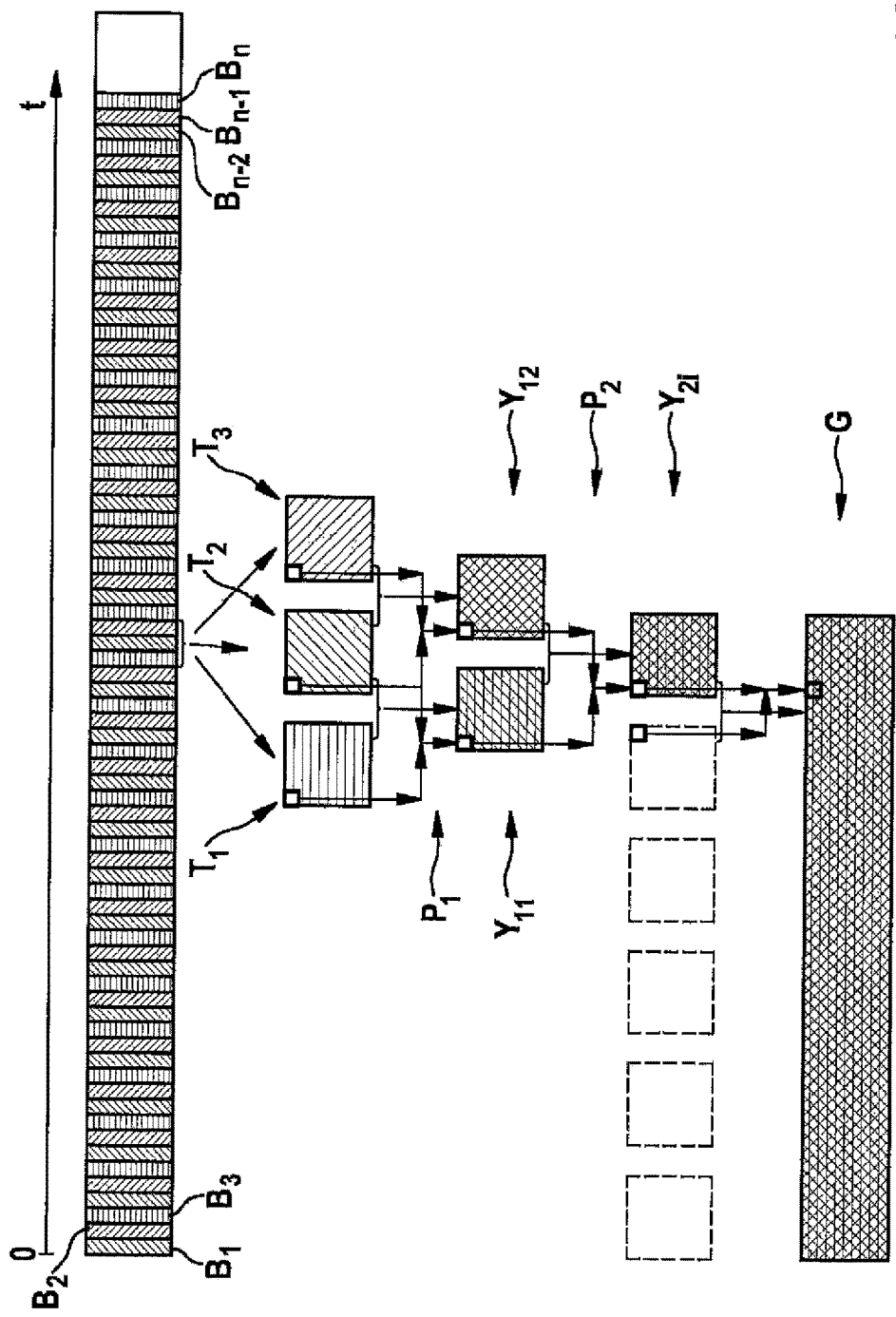

INSPECTION OF THE CONTOURED SURFACE OF THE UNDERCARRIAGE OF A MOTOR VEHICLE

BACKGROUND OF THE INVENTION

1. Field of the Invention

The present invention relates to a method and a device for inspecting a contoured surface, in particular of the undercarriage of a motor vehicle.

2. Description of the Related Art

Checks and inspections of vehicle undersides have been carried out for decades already. Government authorities, in particular, are keenly interested in such inspections because concealed smuggled goods or bombs need to be discovered.

For that purpose, a mobile device is often used that has wheels and a rod having a mirror mounted thereon. This form of manual-optical inspection has the advantage of being suited for mobile use. However, the middle section of the vehicle undercarriage is usually not able to be reached therewith. With the advent of digital image acquisition technology, the mirror was replaced by a camera (see, for example, the U.S. Patent Application Publication 2002 097 321 A1) or by a remote controlled platform equipped with one or a plurality of cameras (see, for example, the International Patent Application publication WO 2004 110 054 A1). In addition to an improved reach, this technology also enables image data to be recorded and stored to provide an improved inspection of the undercarriage on a monitor, and the actual state of the undercarriage to be compared with stored reference data in a database.

In automotive garages as well, checking the vehicle undercarriage is known as a service offered during maintenance. It is a simple, yet complex procedure for a person to perform a direct visual inspection in an inspection pit or on an auto lift. Inspection pits and auto lifts are location-dependent and expensive, and are not always immediately available because of the garage's capacity utilization.

Manual inspections of the type described require that the vehicle be stationary and that a person implement the procedure.

Methods and devices for performing an automated inspection of the undercarriage are known where the vehicle is in a rolling state. Automatic measuring systems advantageously allow the undercarriage image to be generated relatively simply as a total image in a computer-assisted process. In addition, the image is not generated by one person directly at the vehicle. They make it possible to increase the throughput for security-related systems and reduce the risk to personnel. By automatically generating the undercarriage image in the garage, the advantage is derived that a first inspection of the undercarriage can already be performed and discussed with the customer immediately upon vehicle reception.

The U.S. Patent Application Publication 2008 211 914 A1 describes a method for automatically generating an undercarriage image using a line scan camera. A line scan camera has the drawback of necessitating additional sensors to record the driving direction and the velocity of the vehicle in order to generate a total image of sufficient quality.

The U.S. Patent Application Publication 2007 273 760 A1 describes a method for automatically generating an undercarriage image using a plurality of array cameras. This requires advance knowledge of the position and direction of view of the cameras relative to one another. This relative orientation is computationally determined using the aperture angle of the cameras, the direction of view of the cameras relative to vertical, and the expected distance between the cameras and the undercarriage. The individual images are rectified and combined into one single undercarriage image.

Illumination poses a problem when generating an undercarriage image of good quality using sequentially recorded individual images of the vehicle passing over. The imaging of all subobjects is significantly determined by the illumination using optimum contrast. Besides the reflectivity of the surface, considerable influence is brought to bear by the depth extension the object. It is known that the required illumination intensity increases with the square of the distance between the illumination source and the object. The different distances between the camera and the object are already solely provided by the aperture angle of the camera. Even in the case of a planar object, the distances to the camera from the object parts located at the image border, are inevitably further than in the image center. In addition, due to the design thereof, the objective lens can also have a radial brightness loss (vignetting). Even microlenses on the sensor surface used for focusing can cause a vignetting. Since the undercarriage of a vehicle also generally has objects that are graduated in depth, it is difficult to optimally illuminate all subobjects.

Known approaches heretofore are aimed at two-dimensionally optimizing a homogeneous light propagation front by locally varying the illumination intensity and/or illumination direction to compensate for the described effects of the brightness loss toward the image border.

For this, the German Patent DE 10 134 975 B4 employs a plurality of LEDs, each of which is equipped with an individual lens or, alternatively, an LED light strip having a cylindrical or Fresnel lens that is designed as a light-transmitting semicircular rod, for example.

At the core thereof, the U.S. Patent Application Publication 2008 211 914 likewise aims at optimally illuminating individual images transversely to the driving direction. For that purpose, a special LED array is provided that is suited, in particular, for a line scan camera. The number of LEDs is increased toward the image margin, and the emission direction of the LEDs is varied. A module for the illumination control controls the illumination of the individual LEDs, the illumination time being dependent on the direction.

BRIEF SUMMARY OF THE INVENTION

It is an object of the present invention to improve the imaging quality when capturing the image of a surface and, in particular, to avoid a loss of quality of the imaging associated with a different illumination of individual image regions.

A method according to the present invention for providing an image of a surface, which may also be a contoured surface, such as the undercarriage of a motor vehicle, for example, using at least one image capturing device, encompasses the steps of:

a) recording images of at least two regions of the surface using different light exposure and/or illumination;
b) generating an optimized image for each of the regions from the images recorded from the particular region; and
c) assembling the optimized images generated for the individual regions of the surface to form an optimized total image of the surface.

The present invention also encompasses a device for providing an image of a surface, including a contoured surface, such as the undercarriage of a motor vehicle, for example, having:

a) at least one image capturing device that is designed for recording images of at least two regions of the surface using different light exposure and/or illumination;
b) an image optimization device that is designed for generating an optimized image for each of the regions from the images recorded by the image capturing device for each region; and
c) an image synthesis device that is designed for assembling the optimized images generated by the image optimization device for the individual regions of the surface to form an optimized total image of the surface.

Because the total image is assembled from differently illuminated partial surface images that each form an image of one surface region, each partial image having been recorded using a light exposure and/or illumination optimized for the particular region, it is possible to provide a total image of the surface that has been light exposed in an optimized manner in all regions and, in particular, to avoid underexposed and/or overexposed regions. Contrast may be used to image both surfaces having widely varying reflective properties, for example, including white and black regions, as well as contoured surfaces that have a widely varying depth extension. This allows the undercarriage of a motor vehicle to be imaged in an optimized manner and optically examined on the basis of the generated image.

The contrast is derived from the minimum and maximum intensities in the image, respectively from practical considerations regarding minimum and maximum grayscale values in the image. The contrast may assume a value of between 0 and 1. For purposes of contrast optimization, grayscale values in the images are modified so that the contrast number approximates value 1 as closely as possible. When a plurality of images or a plurality of regions of an image is compared, the image or the region having the highest contrast number is referred to as the image or as the region having the optimum contrast. Other information for determining the contrast within an image may be inferred from the Peter Haberäcker documents, *Digitale Bildverarbeitung—Grundlagen and Anwendungen* [Digital Image Processing—Fundamentals and Applications], 4$^{th}$ edition, Hanser Publishers 1991, ISBN 3-446-16339-5 or Thomas Luhmann, Close-Range Photogrammetry—Fundamentals, Methods and Applications, 2nd edition, Wichmann Publishers 2003, ISBN 3-87907-398-8.

The light exposure may be adjusted, in particular, by varying the aperture and/or the light exposure time of the image capturing device.

Alternatively or additionally, the illumination may be varied by modifying the illumination intensity and/or the illumination duration for each image.

For that purpose, the device may include at least one illumination device that is designed for illuminating at least one surface region. For this, the illumination device may include one or a plurality of illumination elements and an illumination control device that is designed for the control thereof. The illumination device may be adaptively controlled taking into account the recorded images in order to adjust the optimum illumination intensity.

An illumination device allows the method to be implemented independently of the ambient conditions, i.e., the natural light conditions of the ambient environment and, in particular, even in the case of a 24 hour use in darkness.

A plurality of illumination elements having different emission directions may be used in order to contrast the edges of the partial objects (segmentation). A combination of cameras having an opposite view may also be used to reduce spaces that are out of the visibility range.

The illumination elements may be permanently turned on or pulsed. Pulsed illumination elements are synchronized with the image capturing device in order for the light pulse to be emitted at the same instant and generally for the same duration as the sensor's light exposure. However, the pulse duration may also be selected to be shorter than the sensor's light exposure duration when the shortest, technically possible image acquisition duration of the image capturing device used for partial objects having high reflectivity still leads to a halation in the image. On the other hand, a pulse duration that is longer than the light exposure duration of the image acquisition sensor is adjusted when there is insufficient synchronism between the image acquisition and illumination.

If the illumination device is composed of more than one illumination element, the illumination elements may be disposed in one row transversely to the driving direction or in two or more rows transversely to the same, forming an illumination matrix of n×m illumination elements.

The illumination matrix may contain illumination elements having identical or different wavelengths and identical or different maximum illumination intensities.

The use of an illumination row or of an illumination matrix advantageously permits the illumination location and thus the illumination direction to also be varied in addition to the illumination duration and intensity when an object point is acquired multiple times. Thus, solely the spatial configuration of the illumination elements automatically permits an illumination from different directions. Moreover, in terms of structural design, individual illumination elements may also be provided with deviating emission directions.

An illumination matrix allows the illumination direction to be kept constant from image to image, for example, when the vehicle continues to advance (concurrent illumination). By sequentially turning on individual illumination rows of the illumination matrix, the adaptive illumination may be more readily optimized when the movement is predicted, as described below, because the change in the illumination direction may be compensated for.

An illumination from different directions makes it possible to reduce shadowed regions. By acquiring objects from different illumination directions multiple times, an image may be created from the individual acquired images where the shadowed regions have been minimized.

Methods are also known that make it possible to extract contours from shadows by changing the illumination directions. They are better suited than intensity-based edge detection methods, such as the Canny operator, for example. Shadows are highly pronounced in regions where there is a discontinuous surface change, such as at edges, for example. The strength of these methods resides in the capture of these discontinuous surfaces, so that they are well suited for segmenting the partial objects. However, partial objects having similar reflectivity at different object depths may be thereby effectively differentiated from one another. In this regard, there is no need for the geometric correlation to be known between the image capturing device and the illumination device.

An illumination device, which has at least one illumination element, preferably an LED, may emit light that is visible or invisible to the human eye. If more than one illumination element is used, any desired light wavelengths may also be used at different image acquisition times, so that an object point is illuminated multiple times using fluctuating wavelengths and fluctuating light intensities. This simplifies the localization of potential problem surface areas, in particular, of an automotive undercarriage.

The illumination stages may also be adaptively regulated. Either the adaptive adaptation is performed by analyzing the first individual images and, subsequently thereto, is definitively set for the further acquisition on the basis of the results of the analysis; or the analysis and adaptation are carried out periodically and remain constant for an image cycle of x images; or the analysis and adaptation are carried out continuously from image to image. The image analysis for adaptively regulating illumination is performed on the basis of known digital image processing methods. Thus, for example, either the histogram and/or the image contrast may be examined with regard to minimum, maximum or average values, either in the total individual image or in at least one image area.

The advantage of the adaptive regulation resides in the flexibility with respect to fluctuating light conditions, as well as in the flexibility with respect to fluctuating distances between illumination elements and partial objects, both on the undercarriage of a vehicle, as well as from vehicle to vehicle, as well as in the flexibility with respect to fluctuating reflectivity of the partial objects.

The advantage of adaptive adaptation is approximately predicting the next position of the vehicle relative to the image capturing device and the illumination elements. The trajectories of distinctive image contents are determined in real time by calculating the optical flow, for example. The positions of relevant partial objects in the next images may be predicted from the history of the trajectories of the preceding images, and illumination elements may be thereby selectively turned on and off, as described further above.

In addition, a 3D depth measurement of partial objects is advantageous for the adaptive illumination regulation. A 3D depth measurement is possible by stereo triangulation, for example, when at least two image capturing devices are used whose object details overlap. Knowledge of the distance between the image capturing device and the object and the object's depth extension facilitate the adaptation of the parameters for the best possible light exposure control.

A further advantage is provided by an adaptive regulation, it being monitored whether the light exposure time and/or the illumination intensity no longer satisfy the requirements of an optimum contrast, but do not need to be readjusted because the technical possibilities of the image capturing device and illumination device have been exhausted. The driver is then immediately prompted by a display unit, for example, to slow down, making it possible to increase the number of illumination stages. Or, however, the image acquisition is interrupted, and the driver is prompted to cross over again, this time, right from the start, at a lower velocity.

The velocity of the surface movement relative to the image capturing device, in particular the velocity of a vehicle, may be approximated by the known acquisition frequency and the at least approximately known distance of the image capturing device to the undercarriage. For that purpose, an object feature is sought in at least two images, and the path covered in the image is correlated with the image acquisition frequency and the distance between the image capturing device and the undercarriage. It is advantageous to use a plurality of object features and to calculate the average of the thus ascertained individual velocities. The velocity ascertained from object features may likewise be utilized to identify invalid measurements in response to exceedance of the predefined velocity.

The method according to the present invention is independent of the moving direction of the surface, respectively of the driving direction of the vehicle. The surface may even move diagonally to the orientation of the measuring unit and also cross the measuring unit backwards. Moreover, the algorithm for generating the 2D total image recognizes if the surface, respectively the vehicle has been stopped and, in some instances, even if it has moved slightly in the opposite direction before continuing the drive thereof. The image data are adjusted accordingly. In addition, the method is independent of the side from which the measuring unit is crossed over.

To examine the surface, the generated 2D total image is displayed on a monitor. The user has the option of enlarging image areas and of moving an enlarged image area within the total image. This makes an assessment by the user readily possible. Damaged areas recognized as problematic may be identified interactively in the image (for example, circles in different colors). The result may be directly discussed with the customer and handed to him/her as a digital copy or as a paper print-out.

The measurement data and results are optionally transmitted to and stored on a server.

The method may be carried out in an automated process on a vehicle in a rolling state in order to optically image and examine the undercarriage thereof. The method and the device are suited, in particular, for areas of low motor vehicle velocities, such as entrance ramps to service stations, garages, and parking spots where the undercarriage is to be inspected.

Objective lenses having vignetting and/or image sensors having microlenses may be used in the image capturing device.

In one specific embodiment, the image optimization device is designed for generating an optimized image for a region in step b) in that features are identified in the differently light-exposed and/or illuminated images of the particular region that are imaged using optimized contrast, and the image containing the most features imaged using optimized contrast is selected as an optimized image. This provides a simple method for generating an optimized total image that yields good results.

In one alternative specific embodiment, the image optimization device is designed for generating an optimized image for a region in step b), in that at least one synthetic intermediate image is generated from two images of the same region, respectively, that were acquired using different illumination/light exposure, and partial objects are identified in the partial images and synthetic intermediate images using optimum contrast.

The margins of the individual partial objects are preferably adapted upon assembly of the same in order to avoid artifacts at the interfaces between the assembled partial objects.

In another specific embodiment, when the images are assembled in step c), the margins of the individual images are adapted by the image synthesis device to avoid artifacts at the interfaces between the assembled images and thereby enhance the image quality. The image margins may be adapted, for example, by a local histogram adaptation that has proven effective as a digital image processing method.

In one alternative specific embodiment, the image optimization device is designed for generating an optimized image for a region in step b) in that, using variance-based contrast adaptation, at least one synthetic intermediate image is generated from two images of the same region, respectively, that were acquired using different illumination/light exposure. Very effective results may be achieved using such a method that includes generating synthetic intermediate images.

BRIEF DESCRIPTION OF THE DRAWINGS

FIGS. 8a through 8c show the capturing of an image sequence, including three light exposure stages, for example, that are realized by varying the illumination intensity while vehicle 2 moves over image capturing device 14.

FIG. 12 shows the data analysis in accordance with an alternative exemplary embodiment using an image acquisition having three illumination stages and illustrating the pyramid-like procedure for generating synthetic intermediate images $Y_{11}$, $Y_{12}$, $Y_{2i}$.

DETAILED DESCRIPTION OF THE INVENTION

Figure 1:
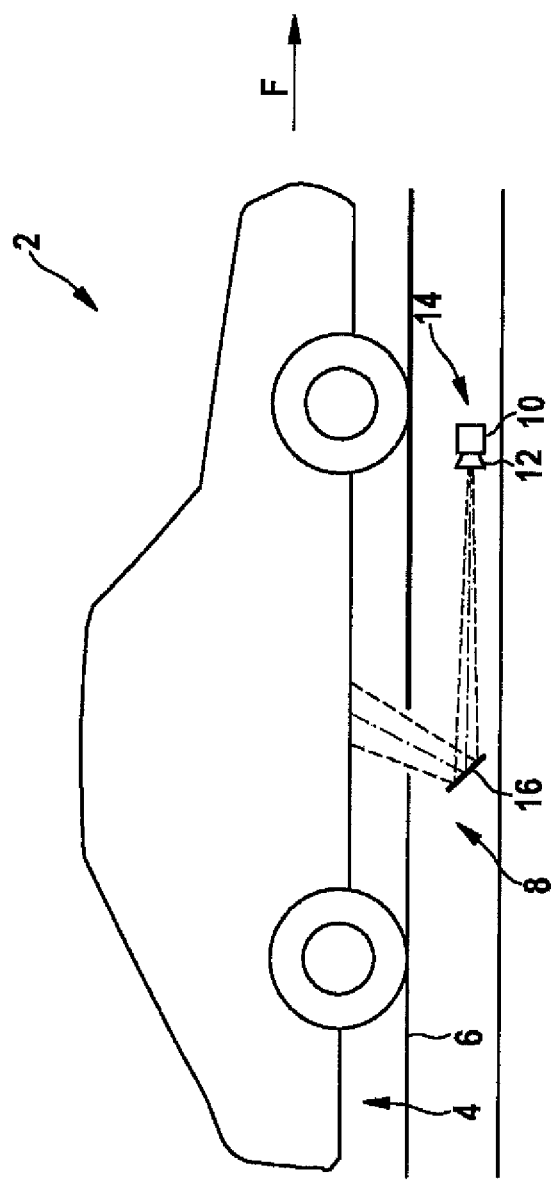
FIG. 1 shows a schematic lateral view of a device for acquiring images of undercarriage 4 of a motor vehicle 2.

FIG. 1 shows a schematic lateral view of a device for acquiring images of undercarriage 4 of a motor vehicle 2. An image capturing device 14 is located in a recess 8 underneath roadway 6 or in a fixed position within a threshold for driving over on roadway 6. If vehicle 2 crosses over image capturing device 14 in driving direction F (in FIG. 1, from left to right), image capturing device 14 is able to acquire images of undercarriage 4. Image capturing device 14 encompasses at least one s/w or color camera 10 equipped, for example, with a planar sensor (CCD, CMOS, . . . ) and an objective lens 12. One or a plurality of mirrors 16 may be used to reduce the requisite installation space.

The resolution of the images acquired by image capturing device 14 depends on the imaging scale used for imaging an object detail on the planar sensor of image capturing device 14. The imaging scale is a function of the focal length and of the distance between image capturing device 14 and undercarriage 4. The focal length and the imaging properties of objective lens 12 (for example, the depth of focus) are selected to allow undercarriage 4 of all vehicles 2 of one category (for example, a passenger vehicle) to be imaged with sufficient quality. For that purpose, an estimation suffices that, for all passenger vehicles, undercarriage 4 is located approximately at a distance of 100 mm to 500 mm above roadway 6.

By dimensioning image capturing device 14 for the least favorable case, i.e. for vehicles 2 having the greatest possible distance of undercarriage 4 from roadway 6, an image resolution is ensured that suffices for examining undercarriage 4 for potential damaged areas. Image capturing devices 14 having suitably adapted optical properties may possibly be used for other vehicle categories (such as commercial vehicles, trucks, buses, for example).

The quality of the images is also dependent on the velocity of vehicle 2 and the light exposure time. Assuming that vehicle 2 moves at a low velocity, i.e., at less than 15 km/h, for example, over image acquisition device 14, the light exposure time is selected in a way that results in a negligible motion blur in the images due to moving vehicle 2. If the velocity is too high, a resultant motion blur in the image leads to a degradation of the contrast and may be utilized for recognizing invalid measurements caused by exceedance of the predefined velocity.

The light exposure time depends decisively on the available light. At least one illumination device (not shown in FIG. 1) having one or a plurality of illumination elements that are tuned to the properties, in particular the spectral region of the image acquisition sensor, may be used to supplement the naturally present ambient light. This is especially necessary for a system having 24 hour use that is also intended for use in darkness.

Figure 2:
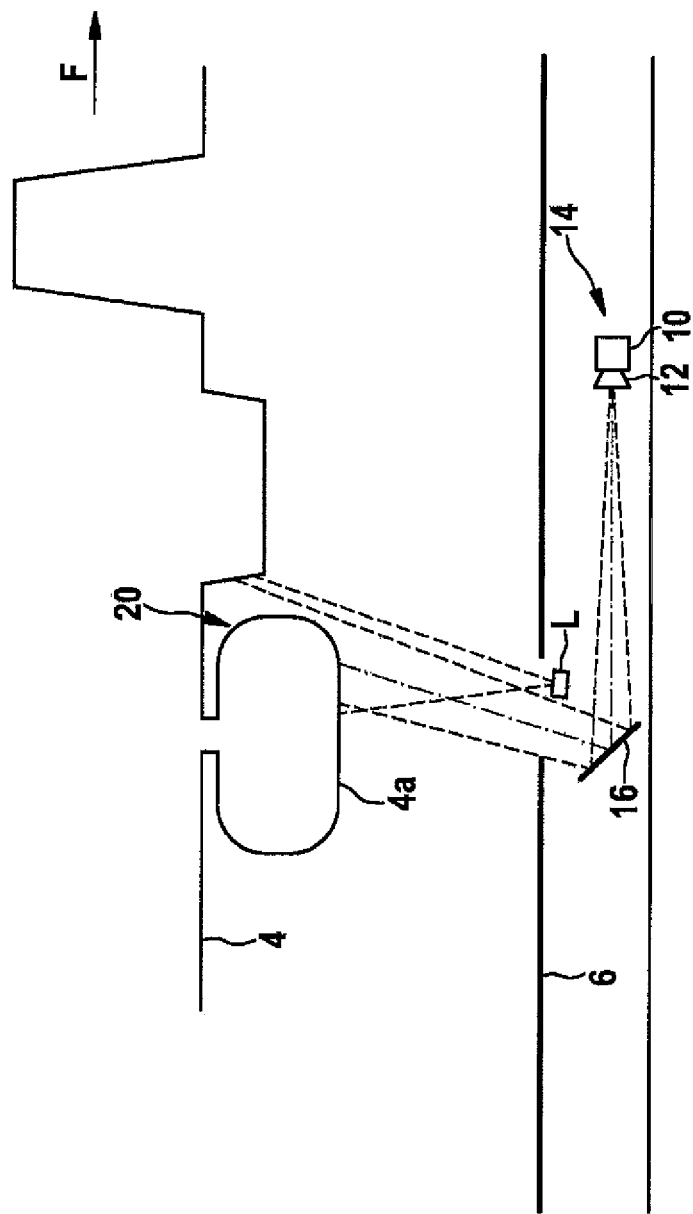
FIG. 2 shows exemplarily the configuration of an illumination device L and the acquisition of an image of a vehicle 2 driving over the measuring device.

FIG. 2 shows exemplarily the configuration of an illumination device L and the acquisition of an image of a vehicle 2 driving over the measuring device that has an undercarriage 4 that is graduated in depth. It is readily apparent that components 4a, which project from undercarriage 4, may cause masking and/or vignetting 20 of the recorded image, thereby preventing camera 10 of image capturing device 14 from being able to completely record undercarriage 4.

Figure 3:
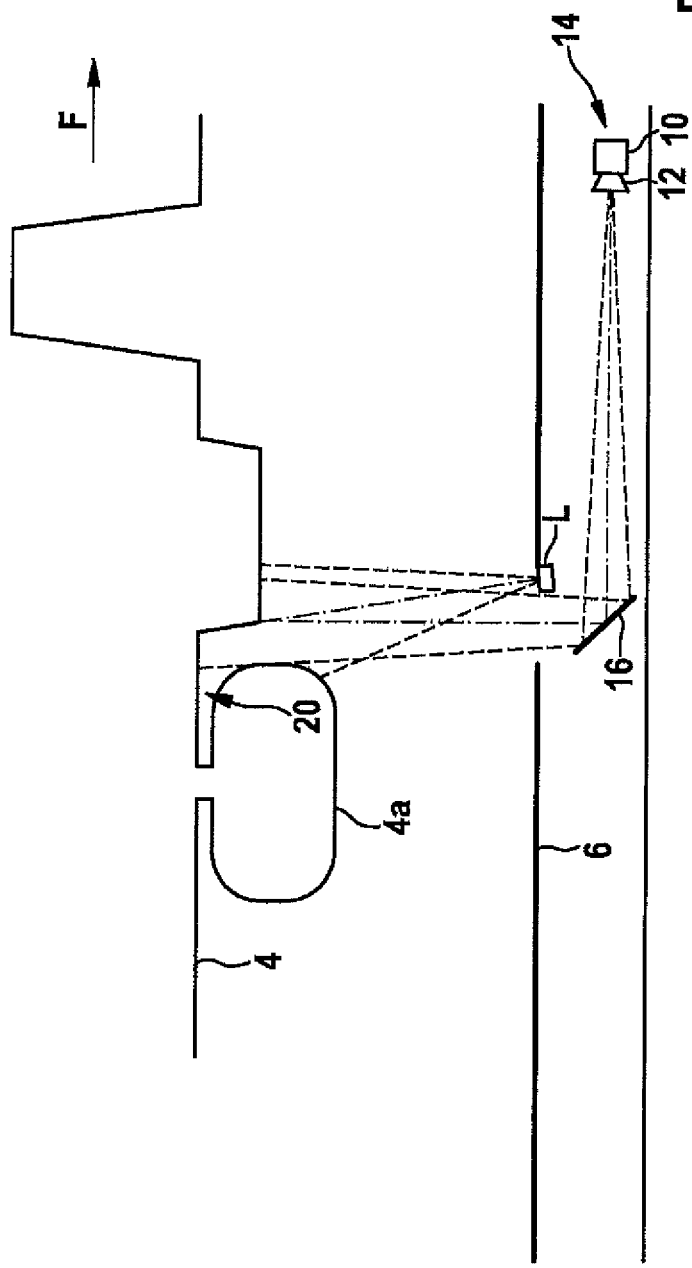
FIG. 3 shows an alternative configuration where the capturing device is essentially oriented perpendicularly to road plane 6.

FIG. 3 shows an alternative configuration where the capturing device is essentially oriented perpendicularly to road plane 6 to reduce any masking 20 of regions of undercarriage 4. While maintaining the described measuring principle, it is advantageous to use more than one image capturing device 14 and/or more than one illumination device L.

Figure 4:
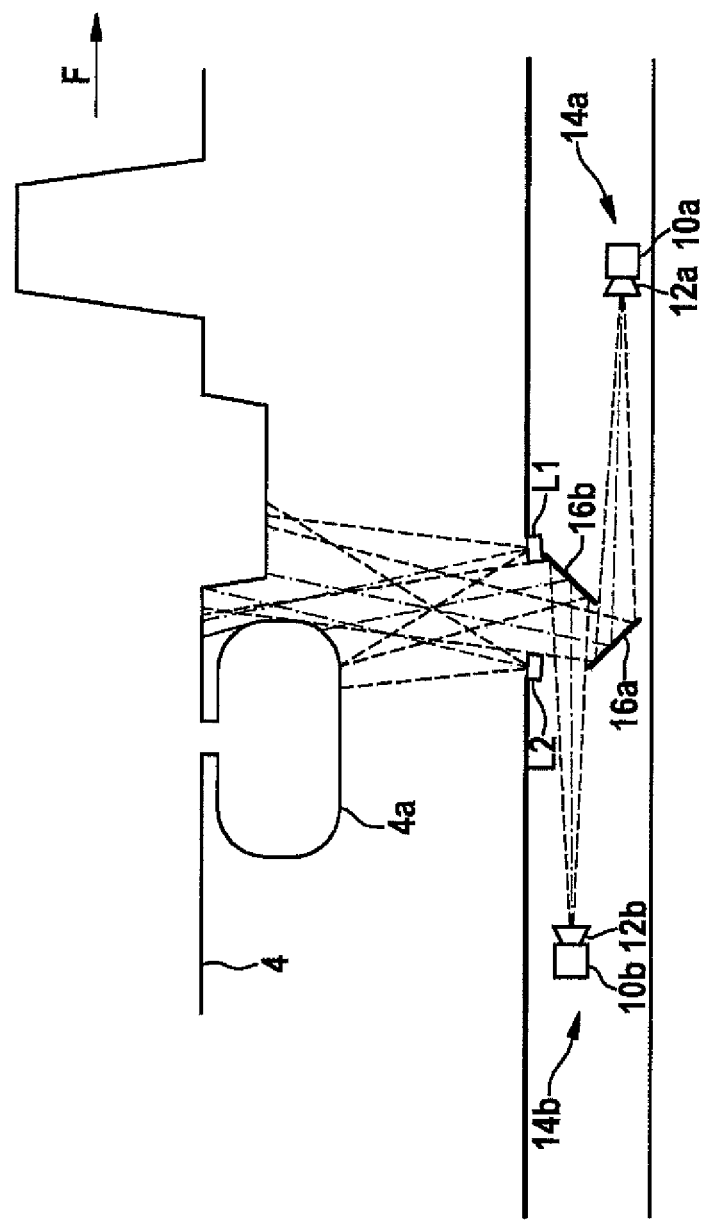
FIG. 4 shows exemplarily an exemplary embodiment that features a combination of two oppositely oriented image capturing devices 14a, 14b having two illumination elements L1, L2.

FIG. 4 shows exemplarily an exemplary embodiment that features a combination of two oppositely oriented image capturing devices 14a, 14b having two illumination elements L1, L2, whereby the spaces, which are out of the visibility range, are further minimized parallel to driving direction F. The quality of the representation of undercarriage 4 in the recorded images may be enhanced by reducing regions that impede the view that result by bilateral masking of components 4a, and/or in that the illumination direction is optimized in order to better illuminate object details of undercarriage 4. Analogously, a plurality of image capturing devices 14a, 14b and illumination elements L1, L2, which are disposed transversely to driving direction F, may also help reduce regions that are out of the visibility range transversely to driving direction F.

Figure 5:
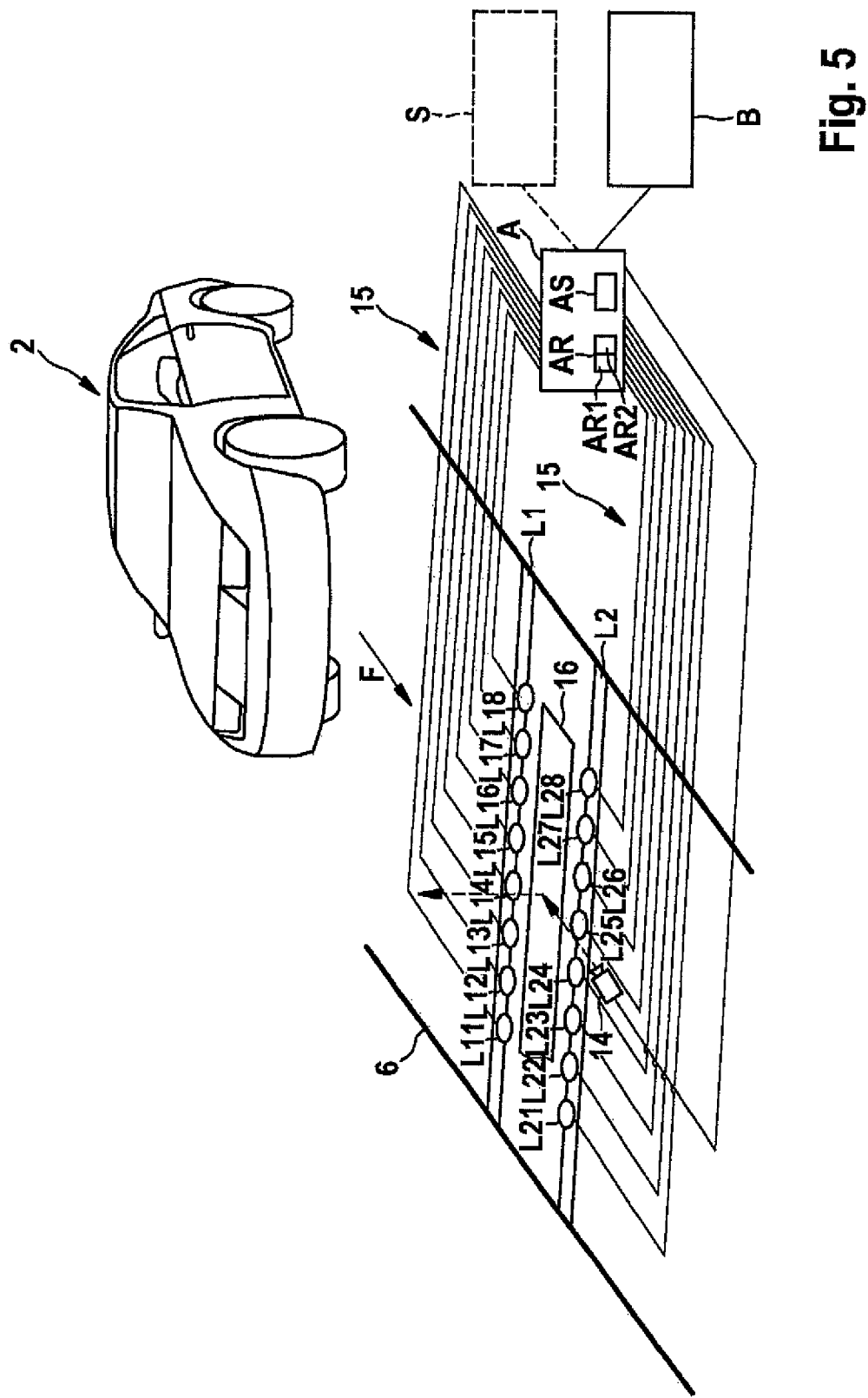
FIG. 5 shows schematically an exemplary embodiment of a device for surveillance of undercarriage 4 of a motor vehicle 2 having an image capturing device 14, a mirror 16, and an illumination device L that includes two illumination rows L1, L2.

FIG. 5 shows schematically an exemplary embodiment of a device for surveillance of undercarriage 4 of a motor vehicle 2 having an image capturing device 14, a mirror 16, and an illumination device L that includes two illumination rows L1, L2, each having eight light emitting elements L11-L18 and L21-L28, that are configured in or on a roadway 6 transversely to driving direction F of motor vehicle 2. Image capturing device 14 and illumination rows L1, L2 are connected via electrical cables 15 to a measuring and evaluation unit A. Moreover, measuring and evaluation unit A is connected to a display unit B and, optionally, to a server S.

Measuring and evaluation unit A is designed for controlling image capturing device 14, illumination rows L1, L2, as well as for storing the images recorded during each drive-over.

Measuring and evaluation unit A encompasses a memory unit AS and a processing unit AR, which, in particular, includes an image optimization device AR1 and an image synthesis device AR2, and is equipped with an evaluation software to perform the illumination control, the analysis and postprocessing of the image data, to test for exceedance of the optimum velocity, and, finally, to provide an optimized total image G. Measuring and evaluation unit A also controls display unit B that is provided for displaying the undercarriage image information and optionally transmits information to a higher-level server S.

Measuring and evaluation unit A may also be designed as an integral part of image capturing device 14 ("intelligent camera").

The inspection system may be expediently integrated in a drive-over channel, as is known from and has proven to be practical in road construction.

Figure 6:
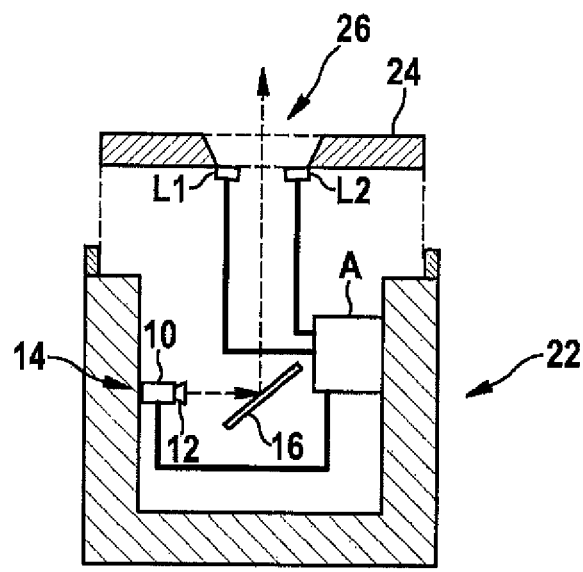
FIG. 6 shows an exemplary embodiment of such a drive-over channel 22 in cross section.

FIG. 6 shows an exemplary embodiment of such a drive-over channel 22 in cross section. Measuring and evaluation unit A is laterally mounted on a wall of drive-over channel 22 in order to protect it from water that penetrates into the same, in some instances that collects at the bottom thereof.

Drive-over channel 22 is sealed by a cover 24. Cover 24 has a slot 26 that permits a line-of-sight connection between image capturing device 14 and undercarriage 4 of a motor vehicle 2 (not shown in FIG. 6) that drives over drive-over channel 22. Illumination devices L1, L2 are configured underneath or within cover 24.

Figure 7:
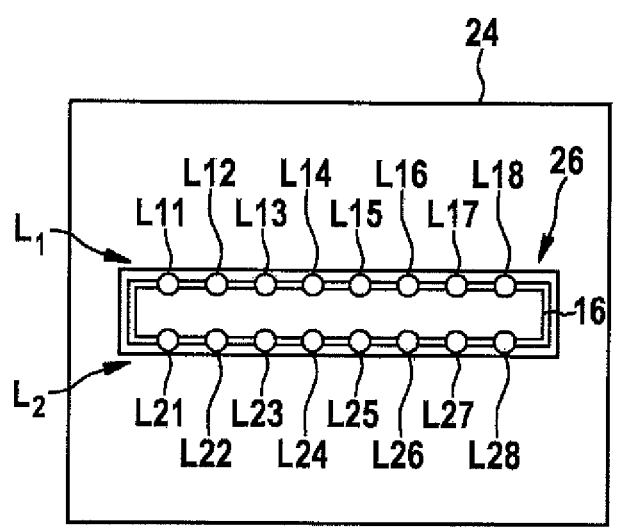
FIG. 7 shows cover 24 in a schematic plan view.

FIG. 7 shows cover 24 in a schematic plan view. Discernible through slot 26 are mirror 16 and illumination rows L1, L2 having light-emitting elements L11-L18 and L21-L28.

FIG. 8a through 8c show the capturing of an image sequence, including three light exposure stages, for example, that are realized by varying the illumination intensity while vehicle 2 moves over image capturing device 14. In FIG. 8a, image capturing device 14 captures the undercarriage with a low first illumination intensity B1 (image m, light exposure intensity B1-1); correspondingly in FIG. 8b and FIG. 8c, images m+1 and m+2 with varied, in particular greater illumination intensities, for example, B1-4 and B1-9. First, low illumination intensity B1-1 is set again for following image m+3; then second illumination intensity B1-4 again for image m+4; third illumination intensity B1-9 again for image m+5, etc. Another sequence of illumination intensities is also conceivable, for example, B1-1, B1-4, B1-9, B1-4, B1-1, B1-4, B1-9, etc. Object points on undercarriage 4 of vehicle 2 are imaged in each individual image with a different contrast due to the varied illumination intensity.

Depending on the distance and the surface properties, the object points are underexposed, optimally exposed or overexposed during the imaging process.

Figure 9:
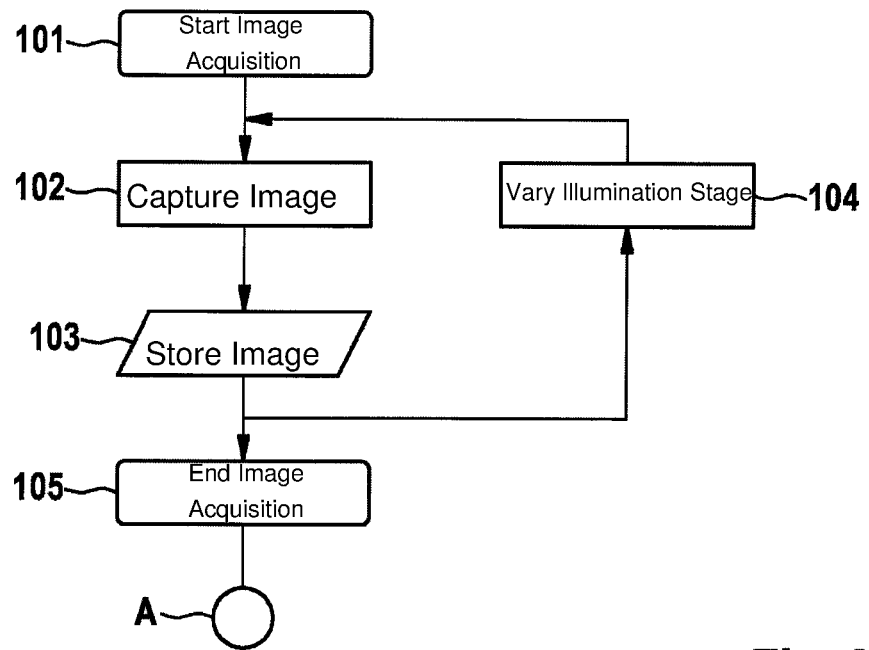
FIG. 9 shows a flow chart of the image acquisition process.

A flow chart of the image acquisition process is shown in FIG. 9.

Following the start of the image acquisition process in step 101, an image is captured using first illumination stage B1-$i$ (step 102) and stored in step 103; subsequently thereto, in step 104, illumination stage B1-$i$ is varied, and steps 102, 103 of the image capturing and storage are repeated until the desired number of variably light-exposed images has been captured; i.e., until the vehicle has completely crossed the measuring device, and the image acquisition process is ended in step 105.

Figure 10A:
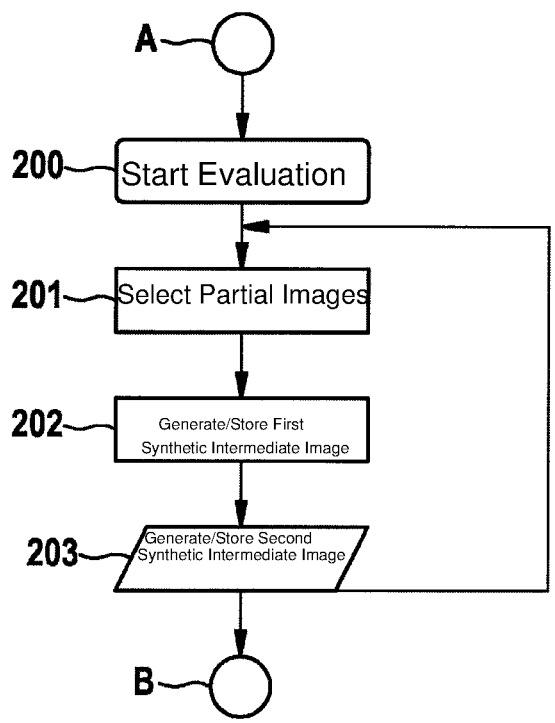
FIGS. 10a through 10c show the sequence of data analysis which begins following the image acquisition process and the associated capturing of the image data.
Figure 10B:
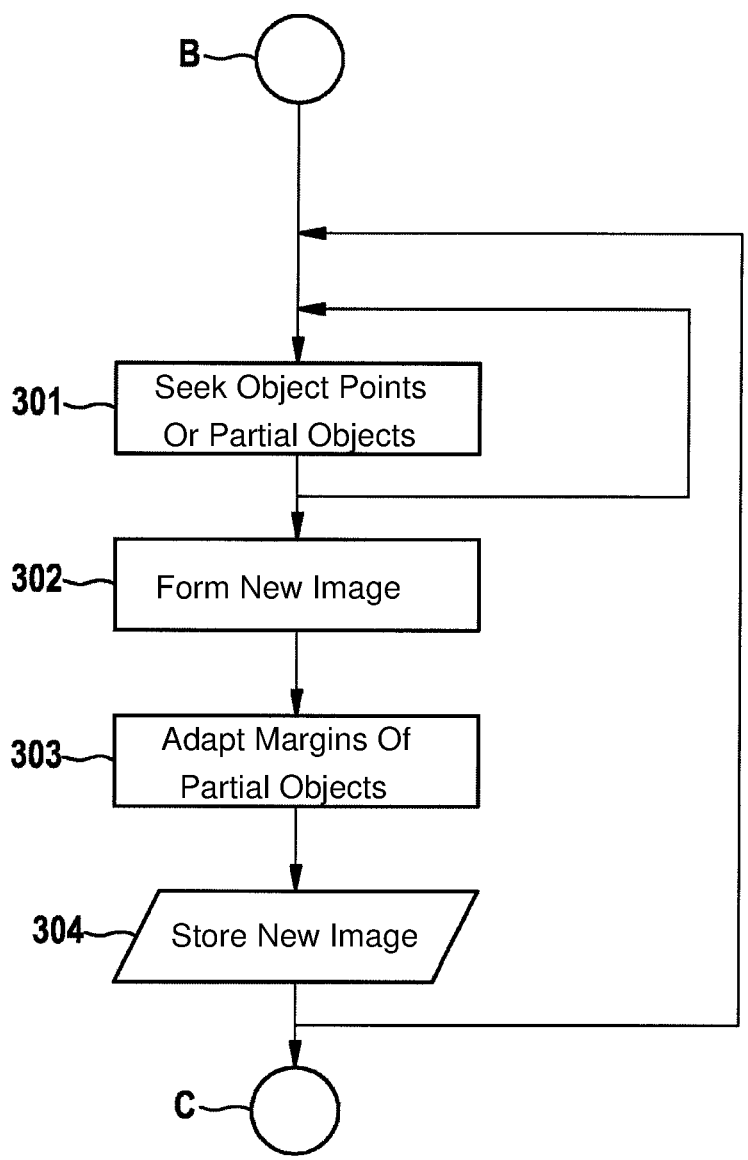
Figure 10C:
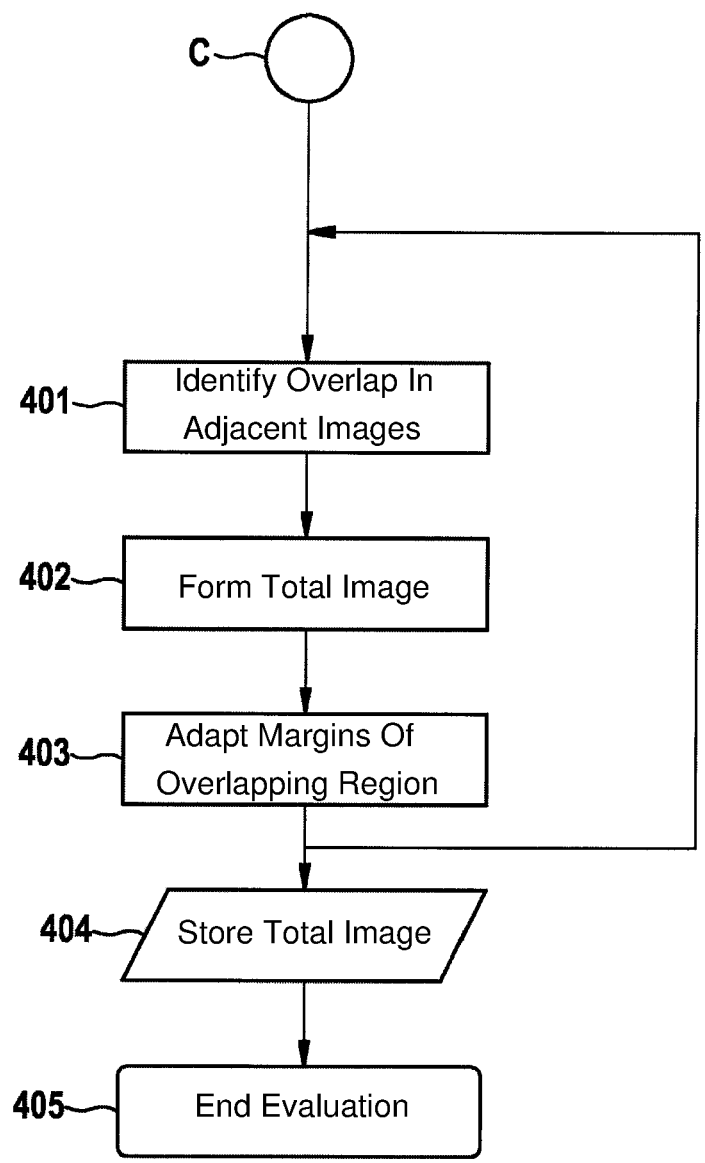

The data analysis begins following the image acquisition process and the associated capturing of the image data. The sequence of the data analysis is schematically illustrated in FIG. 10a through 10c with reference to FIG. 11.

Prior to the data analysis described in the following, other known digital image processing methods may also be used in order to further improve the images and, in particular, the contrast thereof prior to the data analysis.

From images $B_1, \ldots, B_n$ captured in connection with image acquisition process 101-105 described in FIG. 9, following the start of evaluation process (step 200), pairs of two partial images $T_1, T_2; T_2, T_3$ are selected in step 201 that were captured using mutually proximate illumination stages. From the two partial images $T_1, T_2; T_2, T_3$ of an image pair, in step 202, a synthetic intermediate image $Z_1, Z_2$ having a quasi-illumination intensity QBI is generated and stored in each case (step 203).

In partial images $T_1, T_2, T_3$ and intermediate images $Z_1, Z_2$ generated from partial images $T_{1, 2}, T_3$, object points or partial objects, which were imaged using optimum contrast, are sought in step 301 for all illumination stages B1-$i$. These object points or partial objects may correspond to a rectangular image area or also to an image area having an irregular border.

The thus detected object points or partial objects, which are imaged using optimum contrast, are assembled in step 302 to form a new image $E_i$ (stitching) that is stored in step 304 as an optimized individual image $E_i$.

Beforehand, in step 303, the margins of the partial objects are adapted using a local histogram adaptation, for example, to avoid streaks and/or artifacts when placing the partial objects against each other, which would disturb the inspection. These methods, as well as what is generally referred to as "stitching," are known from the digital image processing methods.

The described steps 301 through 304 are repeated n/k times. In this context, n is the number of recorded images $B_1, B_2, B_3, \ldots; B_n$ and k are the number of illumination, respectively light exposure stages during the image acquisition. n/k optimized individual images $E_1, \ldots E_{n/k}$ are generated and stored as an intermediate result.

Figure 11:
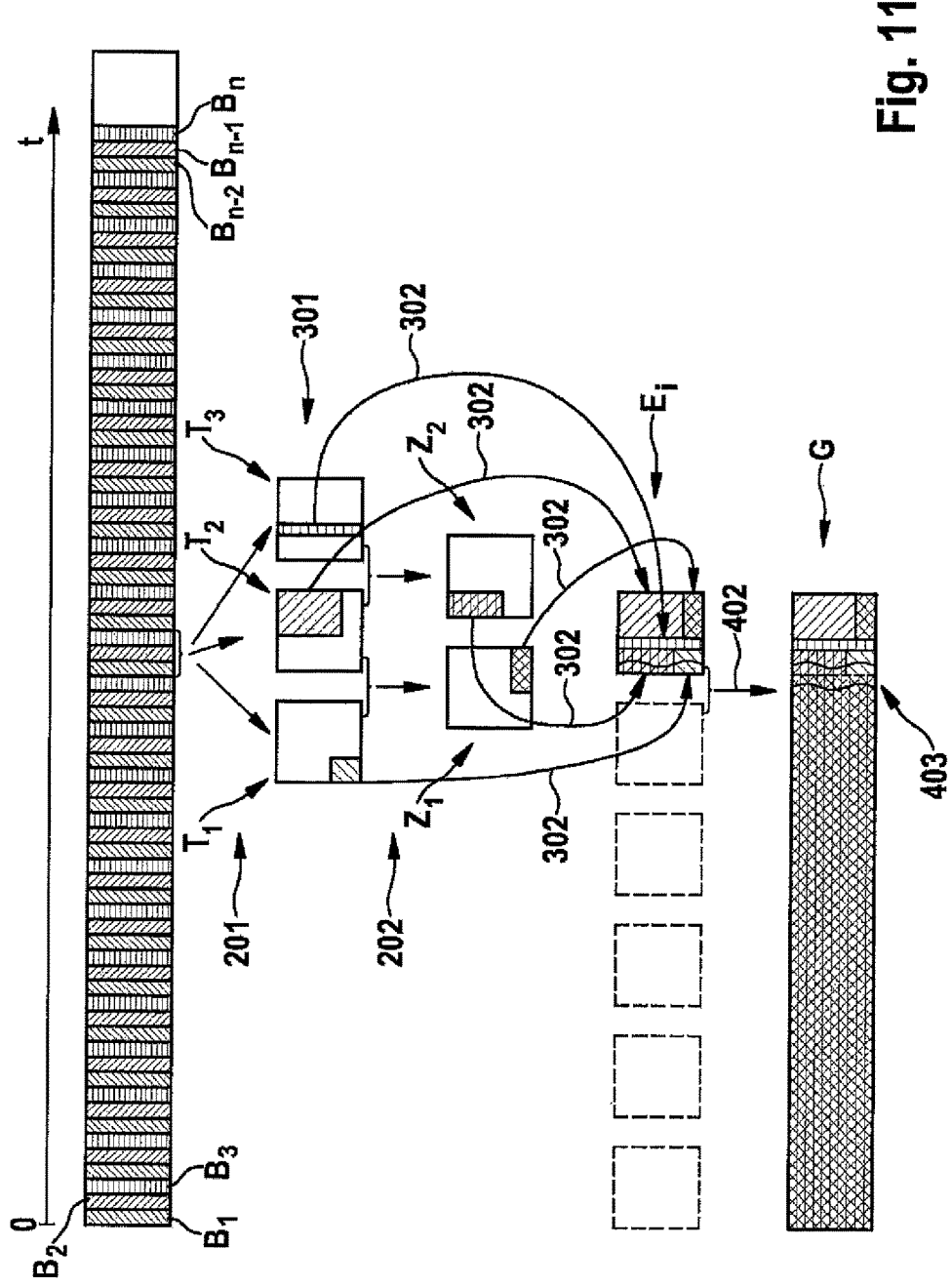
FIG. 11 shows the composition optimized individual image $E_i$ of five rectangular partial objects from five available partial and intermediate images $T_1$, $T_2$, $T_3$, $Z_1$, $Z_2$.

In this context, the composition shown in FIG. 11 of optimized individual image $E_i$ of five rectangular partial objects from five available partial and intermediate images $T_1, T_2, T_3, Z_1, Z_2$ is only shown exemplarily; as previously described, optimized individual image E may be assembled from a desired number of any number of partial regions of any shape of partial and intermediate images $T_1, T_2, T_3, Z_1, Z_2$, as long as the partial regions jointly cover the entire region of optimized individual image $E_i$.

FIG. 10c schematically illustrates how an optimized total image G of automotive undercarriage 4 is generated from optimized individual images $E_i$ by initially identifying the overlapping in each case of two adjacent, previously generated, optimized individual images $E_i$ in step 401, by assembling optimized individual images $E_1, \ldots E_n/k$ to forma total image G ("stitching") in step 402; overlapping image regions in step 403 likewise being subject to a margin adaptation, and optimized total image G being stored in step 404 before the evaluation process is ended in step 405.

In practice, the quality of optimized individual images $E_1$, ... $E_{n/k}$ and of optimized total image G is highly dependent on the number and shape of partial objects 4a, as well as on the characteristics and depth graduation of undercarriage 4.

An alternative exemplary embodiment of a method according to the present invention, which is schematically shown in FIG. 12, eliminates the need for searching and excluding partial objects having optimum contrast. Instead, the alternative method is based on generating synthetic intermediate images $Y_{11}$, $Y_{12}$, $Y_{2i}$ using a variance-based contrast adaptation.

In the process, two partial images $T_1$, $T_2$; $T_2$, $T_3$, which represent the same object detail and were recorded using different illumination stages, are compared to one another to produce an intermediate image $Y_{11}$, $Y_{ki}$. The comparison takes place within an image area of 20×20 pixels, for example, that is displaced in parallel over the two images.

The variance within the image area turns out to be a well suited criterion. A first option is to use the image area having the higher variance for the intermediate image. Even better results are obtained by using the variance differences of the two image areas. A weighted multiplication of the two image areas that is dependent on the variance difference, including subsequent addition, has also proven to be effective in producing a good intermediate image.

FIG. 12 shows the data analysis in accordance with the alternative exemplary embodiment on the basis of the illustrated example of an image acquisition having three illumination stages and clarifies, in particular, the pyramid-like procedure for generating synthetic intermediate images $Y_{11}$, $Y_{12}$, $Y_{2i}$, in each case from two images of adjacent illumination stages $T_1$, $T_2$; $T_2$, $T_3$ in first pyramid stage $P_1$ respectively two adjacent synthetic intermediate images $Y_{11}$, $Y_{12}$ in subsequent pyramid stage $P_2$. In last pyramid stage $P_2$, an optimized individual image $Y_{2i}$ is generated in which each pixel contains information from all input images $T_1$, $T_2$, $T_3$. For the sake of clarity, only two pyramid stages $P_1$, $P_2$ are shown in FIG. 12. However, it is readily discernible to one skilled in the art that and how the method may be easily extended to include any desired number of successive pyramid stages.

The variance-based contrast adaptation may likewise be used in the last step in the generation of optimized total image G for adapting overlapping image regions of optimized individual images $Y_{2i}$.

Other combinations for generating intermediate images $Y_{ij}$ are also possible. Thus, for example, synthetic intermediate images $Y_{ij}$ may be generated from all combinations of input images T that have the same object detail and were captured using different illumination stages; and they, in turn, may be reduced stage for stage until an optimized individual image $Y_{ki}$ is achieved after k stages. The method may also be enhanced to the effect that a synthetic intermediate image $Y_{11}$, $Y_{12}$, $Y_{2i}$ is produced from more than two images having individual weighting.

What is claimed is:

1. A method for providing a contrast enhanced image of a contoured surface of an undercarriage of a motor vehicle with an image capturing device and an illumination device including an illumination matrix formed of a plurality of illumination elements arranged in illumination rows, the method comprising:
   (a) moving the motor vehicle with respect to the image capturing device and the illumination device;
   (b) illuminating the surface with the illumination device by sequentially activating individual illumination rows of the illumination matrix such that the surface is illuminated from different directions;
   (c) recording, using at least one image capturing device, multiple overlapping images of the surface using at least one of different light exposure and different illumination while the motor vehicle is moved with respect to the image capturing device;
   (d) automatically generating partial images of the overlapping areas of the recorded images, wherein at least two partial images comprising the same region of the surface are generated from the images which have been recorded with at least one of different light exposure and different illumination;
   (e) automatically generating, for each region, a contrast enhanced image from the partial images of the respective region; and
   (f) automatically assembling the generated contrast enhanced images to form an enhanced total image of the surface;
   wherein, in step (e) a contrast enhanced image for a region is generated by either
   automatically generating from at least two partial images of the same region, which have been recorded with at least one of different light exposure and different illumination, at least one synthetic intermediate image, identifying partial objects having maximum contrast in the at least one synthetic intermediate image, and assembling the identified partial objects forming the contrast enhanced image; or by
   automatically generating at least one synthetic intermediate image from at least two partial images of the same region, which have been recorded with at least one of different light exposure and different illumination, employing variance-based contrast adaption, and automatically generating the contrast enhanced image from adjacent partial images by employing variance-based contrast adaption.

2. The method as recited in claim 1, wherein the margins of the individual partial objects are adapted upon assembling of the partial objects in order to avoid artifacts at interfaces between the assembled partial objects.

3. The method as recited in claim 1, wherein, upon assembly of the enhanced images in step (e), the margins of the individual images are adapted by a local histogram adaptation to avoid artifacts at interfaces between the assembled enhanced images.

4. A device for providing an contrast enhanced image of a contoured surface of an undercarriage of a motor vehicle, the device comprising:
   (a) at least one image capturing device configured for recording multiple images of each of at least two regions of the surface using at least one of different light exposure and different illumination while the motor vehicle is moved over the at least one image capturing device;
   (b) an illumination device including an illumination matrix formed of a plurality of illumination elements arranged in illumination rows, wherein the illumination device is configured for illuminating the surface by sequentially activating individual illumination rows of the illumination matrix such that the surface is illuminated from different directions;
   (c) a processor providing the functions of an image enhancer and an image synthesizer;

(c1) wherein the image enhancer is configured for automatically generating partial images of the overlapping areas of the recorded images, wherein at least two partial images comprising the same region of the surface are generated from the images which have been recorded with at least one of different light exposure and different illumination; generating an contrast enhanced image for each of the regions from the partial images; and generating a contrast enhanced image for each region from the partial images of the respective region; and (c2) wherein the image synthesizer is configured for assembling the contrast enhanced images generated for each of the at least two regions of the surface to form an enhanced total image of the surface;

(d) wherein the image synthesizer is configured for generating a contrast enhanced image for a region by either (d1) automatically generating from at least two partial images of the same region, which have been recorded with at least one of different light exposure and different illumination, at least one synthetic intermediate image, identifying partial objects having maximum contrast in the at least one synthetic intermediate image, and assembling the identified partial objects forming the contrast enhanced image; or by (d2) automatically generating at least one synthetic intermediate image from at least two partial images of the same region, which have been recorded with at least one of different light exposure and different illumination, employing variance-based contrast adaption, and automatically generating the contrast enhanced image from adjacent partial images by employing variance-based contrast adaption.

5. The device as recited in claim 4, wherein the image synthesizer includes an image-margin adaptation device configured to adapt, upon assembly of the enhanced images, the margins of the individual images by a local histogram adaptation to avoid artifacts at interfaces between the assembled enhanced images.

6. The device as recited in claim 4, further comprising:
at least one illumination device configured for illuminating at least one region of the surface, the illumination device including at least one illumination element and one illumination control device configured for adaptively controlling the at least one illumination element by taking into account the recorded images in order to adjust an enhanced illumination intensity.

* * * * *